United States Patent
Wright et al.

(10) Patent No.: US 6,845,085 B1
(45) Date of Patent: Jan. 18, 2005

(54) SYNCHRONIZATION METHOD FOR A PROCESSING COMMUNICATION SATELLITE

(75) Inventors: David A. Wright, Solana Beach, CA (US); Stuart T. Linsky, San Pedro, CA (US); Gregory S. Caso, Hermosa Beach, CA (US); Reginald Jue, Manhattan Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/408,965

(22) Filed: Sep. 29, 1999

Related U.S. Application Data

(63) Continuation-in-part of application No. 09/330,441, filed on Jun. 11, 1999, now Pat. No. 6,452,962.

(51) Int. Cl.[7] ............................. H04B 7/212; H04J 3/06
(52) U.S. Cl. .................................... 370/324; 370/507
(58) Field of Search ............................ 370/316, 321, 370/324, 503, 507, 508, 519, 350, 516; 375/354, 358

(56) References Cited

U.S. PATENT DOCUMENTS

| | | | | | |
|---|---|---|---|---|---|
| 4,577,316 | A | * | 3/1986 | Schiff ........................ | 370/324 |
| 5,659,545 | A | * | 8/1997 | Sowles et al. ............. | 370/324 |
| 5,790,939 | A | * | 8/1998 | Malcolm et al. .......... | 455/13.2 |
| 5,802,044 | A | * | 9/1998 | Baum et al. ............... | 370/330 |
| 5,867,489 | A | * | 2/1999 | Hershey et al. ........... | 370/509 |
| 5,878,034 | A | | 3/1999 | Hershey et al. | |
| 6,243,372 | B1 | * | 6/2001 | Petch et al. ................ | 370/324 |
| 6,317,441 | B1 | * | 11/2001 | Nakajima ................... | 370/509 |
| 6,452,962 | B1 | * | 9/2002 | Linsky et al. .............. | 375/145 |

FOREIGN PATENT DOCUMENTS

WO WO 80/00771 4/1980

* cited by examiner

Primary Examiner—Chau Nguyen
Assistant Examiner—Soon-Dong Hyun
(74) Attorney, Agent, or Firm—Tarolli, Sundheim, Covell & Tummino L.L.P.

(57) ABSTRACT

The present invention provides a highly accurate synchronization method for a satellite communication system (100). The system maintains a downlink symbol counter at an earth terminal and determines a downlink symbol count representative of the time of arrival of a burst transmitted from the earth terminal to a satellite (106, 206). The earth terminal adjusts the downlink symbol counter to correspond to the downlink symbol count (136, 220) upon arrival of a predetermined reference point in a downlink frame. A timing error may initially be determined by launching an entry order wire from the earth terminal to the satellite (116). The timing error may be transmitted to the earth terminal using a correction code which indicates the transmission is early, late, absent, or no change is required (134, 218). The terminal may make additional periodic timing adjustments based on the length of the propagation path between the earth terminal and the satellite (108, 208). The earth terminal may then precisely time the transmission of bursts from the earth terminal to the satellite (130, 214). The length of the propagation path and the timing error may be stored in the earth terminal so that the earth terminal may reenter the system without undertaking multiple commissioning processes.

52 Claims, 2 Drawing Sheets

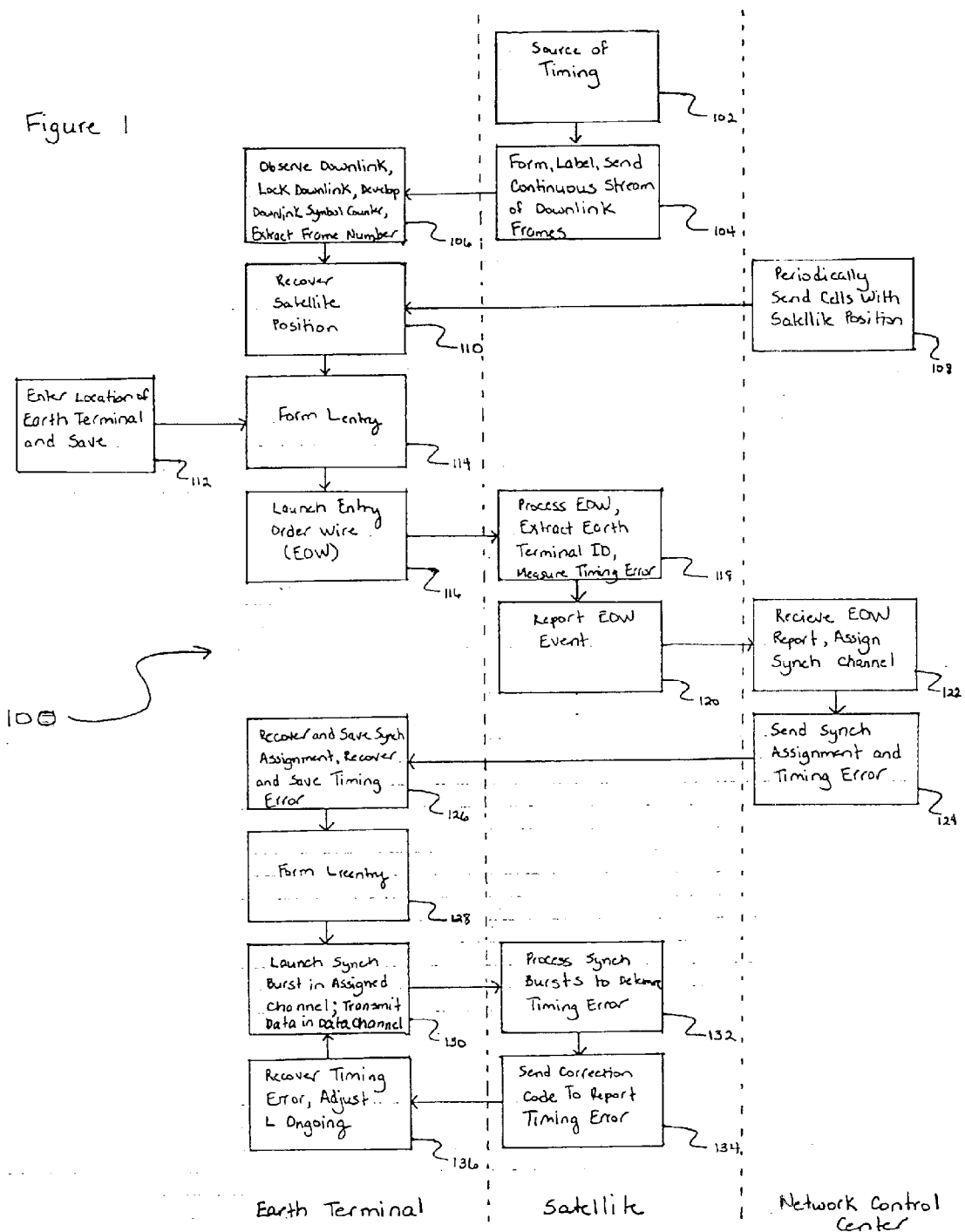

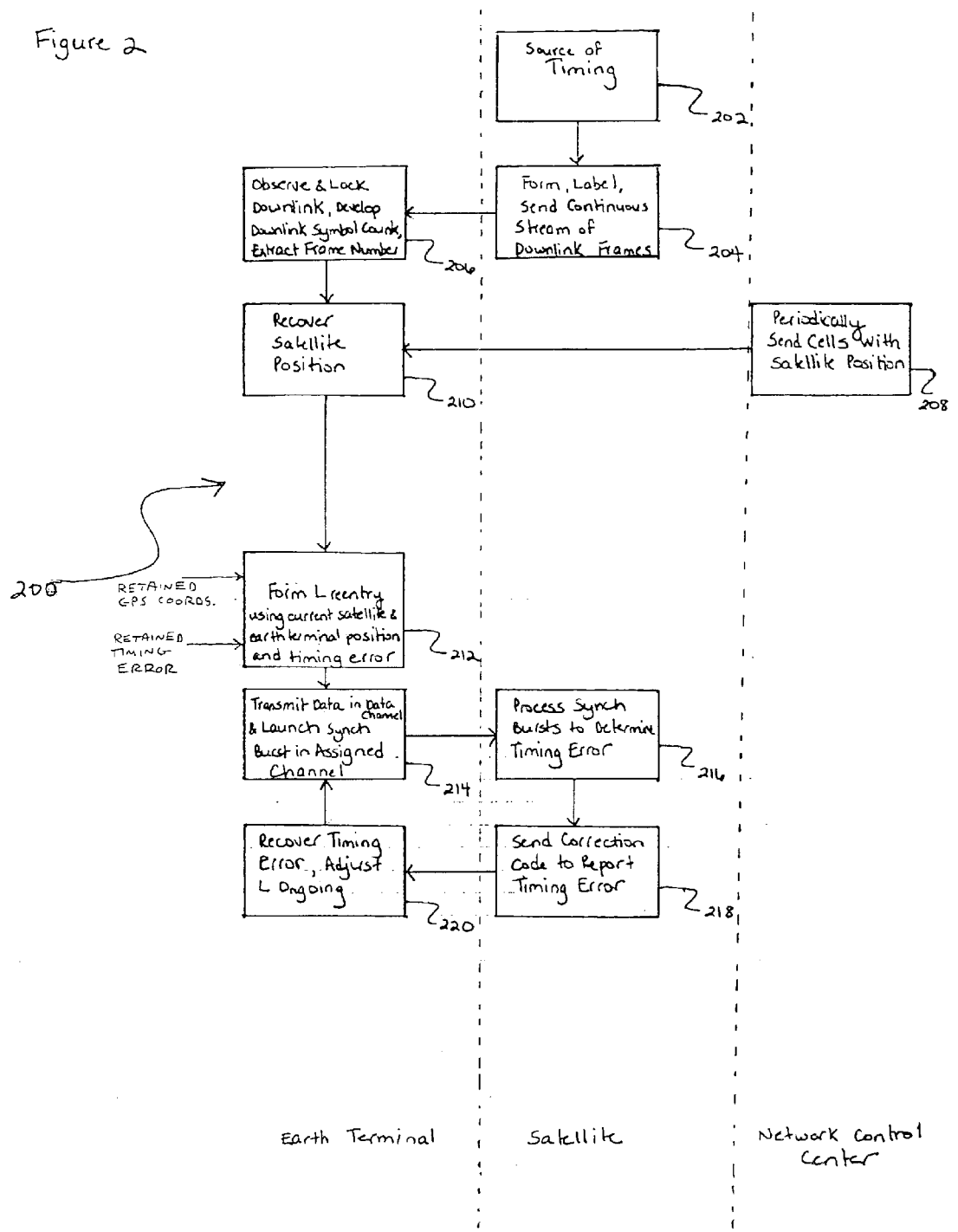

SYNCHRONIZATION METHOD FOR A PROCESSING COMMUNICATION SATELLITE

The present application is a continuation-in-part of application Ser. No. 09/330,441, filed Jun. 11, 1999, entitled "Mitigation Of Co-Channel Interference In Synchronization Bursts In A Multi-Beam Communication System", now issued as U.S. Pat. No. 6,452,962.

BACKGROUND OF THE INVENTION

The present invention relates to satellite communications and more particularly relates to a synchronization method for a processing communication satellite system.

Processing communication satellites routinely relay vast amounts of data between multiple earth terminals each day. Typically, the data is transmitted between the earth terminal and the satellite in bursts. Each burst is composed of discrete cells of information, which collectively form frames. The frames are composed of a predetermined number of symbols, and each symbol may represent multiple bits of information. Frames typically contain specific header information, including, for example, identification, routing, or error detection and correction coding. Additional information may also be used to identify the beginning and ending of each frame within the uplink or downlink transmission.

Processing communication satellite systems typically use single carrier time division multiplexing, or TDM, on the downlink and time division multiple access, or TDMA, on the uplink. On the uplink, the earth terminals are allocated time slots in which they independently transmit bursts to the satellite. Each earth terminal is required to keep its timing system aligned with that of the satellite so that its transmissions do not overlap with the transmissions sent by other earth terminals. One problem faced by existing TDMA systems is the synchronization of the bursts sent by the earth terminals on the uplink to ensure that the bursts do not overlap at the satellite. As a minimum, the uplink bursts must be timed to arrive at a specific time (or specific uplink symbol number) within an uplink frame to avoid overlap from bursts from other earth terminals. Ideally, the time of arrival of a burst would be so precise that its symbols align exactly with the symbol epochs of the satellite receivers, so that the burst may be demodulated without overt symbol timing tracking processing.

The uplink signals and downlink signals are subject to time delays or latencies corresponding to the time it takes the signal to travel between the earth terminal and the satellite. The signals from the earth terminal must be launched in a timely manner in order to arrive at the satellite in the correct time slot at the correct symbol time, and therefore, the time required for the bursts to travel between the earth terminal and the satellite must be taken into account.

Because of the potential for overlapping transmissions, bursts are typically surrounded by guard bands. Guard bands are time intervals in which no transmissions occur, and they are included in transmissions in order to provide a margin of safety against timing error and inter-symbol interference. There are several disadvantages associated with the use of guard bands in transmissions, including wasted bandwidth and reduced data transmission rates. In the past, however, guard bands were required because of the lack of precision in synchronization methods.

Furthermore, in the past, there were no effective synchronization methods which allowed the synchronization of uplinks and downlinks operating at different speeds. Because this is precisely the typical situation in present processing satellite communications, the lack of synchronization methods posed a significant problem. Thus, the satellite communication industry has had to make do with sub-optimal synchronization techniques. For example, as a result of sub-optimal synchronization, prior systems were forced to operate with unacceptably large errors in timing, guard bands, and complex and power consuming demodulation or symbol timing recovery hardware.

Thus, a need has long existed in the industry for a method of precisely synchronizing the uplink and downlink of a satellite communication system.

BRIEF SUMMARY OF THE INVENTION

It is an object of the present invention to provide a synchronization method that precisely controls the time of arrival of uplink bursts transmitted from an earth terminal to a satellite.

It is a further object of the present invention to provide a synchronization method which allows the synchronization of uplinks and downlinks which are operated at differing symbol rates.

It is another object of the present invention to provide for the rapid commissioning of a terminal and the retention of range refinement derived during commissioning.

It is yet another object of the present invention to provide for reentry of the earth terminal into the system without re-commissioning the terminal.

One or more of the foregoing objects is met in whole or in part by a method for synchronizing a satellite communication system. The method includes the steps of maintaining a downlink symbol counter clocked at a downlink clock rate, determining a downlink symbol count representative of the time of arrival of a burst transmitted from an earth terminal to a satellite, adjusting the downlink symbol counter to correspond to the downlink symbol count upon receipt of a predetermined reference point in a downlink frame in the downlink signal, and transmitting bursts from the earth terminal to the satellite in accordance with the downlink symbol counter. Additionally, a downlink symbol counter clock may be extracted from the downlink itself.

The downlink symbol count determination may be made by maintaining a downlink frame counter clocked at the downlink clock rate multiplied by the number of symbols in a downlink frame. The downlink symbol count may be aligned with the satellite's timing by directly extracting a downlink frame number from the downlink signal. The downlink symbol count may then be adjusted to account for the length of the round trip propagation path between the satellite and the earth terminal. This length, which may equivalently be expressed in units of downlink symbol epochs, accounts for the time delay associated with the time it takes the signal to travel between the earth terminal and the satellite.

The one way length of the propagation path may be determined by first obtaining an initial estimate of the length of the propagation path. This initial estimate may be determined by storing the location of the earth terminal in the earth terminal, using GPS coordinates, for example. The position of the satellite may then be provided to the earth terminal, by means of control cells included in the flow of downlink traffic. The length of the propagation path may then be determined by using the satellite position and the earth terminal location.

The length of the propagation path may then be updated periodically. For example, the length may be updated by storing the location of the earth terminal in the earth terminal, updating the satellite position by transmitting updated satellite coordinates to the earth terminal and redetermining the length of the propagation path between the earth terminal and the satellite.

Initial timing error at the time of earth terminal commissioning may be determined by using an initial communication signal. This communication signal may be transmitted from the earth terminal to the satellite and then the timing error may be received from the satellite (although possibly computed elsewhere). The timing error may then be used to redetermine the length of the propagation path between the earth terminal and the satellite. Again, the length of the propagation path may then be stored in the earth terminal. The downlink symbol counter may then be adjusted to account for the length L stored in the earth terminal.

Additionally, a channel for transmitting synchronization bursts may be assigned to the earth terminal, and the channel assignment transmitted to the earth terminal. The downlink symbol counter may be refined by launching synchronization bursts from the earth terminal to the satellite in the assigned channel, processing the synchronization bursts to determine the sign (early or late) of the uplink timing error, transmitting the sign at the uplink timing error to the earth terminal, and adjusting the value of the related symbol counter according to the sign of the uplink timing error. The sign of the uplink timing error may be transmitted to the earth terminal by using a correction code which is indicative of the sign of the timing error. The correction code may be a multi-bit correction code representing that the uplink transmission associated with the earth station is early, late, absent, or that no change is required. The related symbol counter may then be adjusted to account for the uplink timing error.

BRIEF DESCRIPTION OF THE DRAWINGS

FIG. 1 illustrates a flow diagram of the steps for synchronizing the earth terminal with the satellite in accordance with one embodiment of the present invention.

FIG. 2 shows a flow diagram of reentry of the earth terminal into the system in accordance with one embodiment of the present invention.

DETAILED DESCRIPTION OF THE INVENTION

Turning to FIG. 1, that figure illustrates a flow diagram 100 of a method of synchronizing an earth terminal with a satellite according to one embodiment of the present invention. The system encompasses a satellite, an earth terminal, and a network control center (NCC). The steps occurring at the earth terminal include an observation step 106, a first recovery step 110, a location entry step 112, and a first formation step 114. Also shown are a launching step 116, a second recovery step 126, a second formation step 128, a second launching step 130, and a third recovery step 136. The steps occurring at the satellite include a timing step 102, and formation step 104, a first processing step 118, a reporting step 120, a second processing step 132, and a sending step 134. The steps occurring at the NCC include a first sending step 108, a receiving step 122, and a second sending step 124.

As illustrated in FIG. 1, the system uses a closed-loop synchronization method which encompasses the satellite payload, the earth terminal, and the network control center. The reference oscillator on the satellite payload produces a master clock signal (step 102) from which all timing signals in the entire system may be derived. The satellite sends a continuous stream of downlink frames (step 104) at the downlink symbol rate determined by the master clock. The downlink transmission consists of a series of fixed length frames of ND symbols; for example, a downlink frame may consist of 7640 symbols occupying 78 microseconds. Additionally, each downlink frame may have an overhead portion associated with it which may, for example, consist of a fixed synchronization marker of 16 symbols. The overhead portion of each frame may also contain a non-repeating frame number, for example 24 QPSK symbols (representing 48 bits). In general, any of the symbols in a downlink frame may be used as a predetermined reference point to trigger the earth terminal to update or adjust its downlink symbol counter.

The earth terminal then observes the downlink transmission and locks onto it (step 106). From the downlink transmission, the earth terminal can develop a downlink frame counter and extract the downlink frame number (step 106). For example, the earth terminal may recover the downlink frame number as a byproduct of the demodulation process. A one-way earth terminal, which is an earth terminal that receives transmissions from the satellite but does not transmit bursts to the satellite, is fully synchronized when the earth terminal has successfully located the downlink transmission and verified that the synchronization markers occur regularly at intervals of ND. However, a two-way earth terminal, which is an earth terminal that both receives transmissions from the satellite and transmits bursts to the satellite, may use additional feedback steps discussed below to synchronize the earth terminal's uplink timing with that of the satellite.

The NCC periodically updates the position of the satellite by sending data packets (e.g., ATM cells) to the earth terminal (step 108). The position of the satellite may, for example, be determined by the NCC using ephemeris information, and the cells may be sent frequently enough so that the position of the satellite changes by about 3 meters at most, for example, between reports. The earth terminal may then recover the position of the satellite from the cells sent by the NCC (step 110).

The location of the earth terminal is entered into the earth terminal (step 112), for example, by using GPS coordinates. The location of the earth terminal may be stored in the earth terminal's non-volatile memory. The location or position of both the satellite and the earth terminal may be expressed, for example, as coordinates in a geocentric Cartesian reference frame in units equivalent to downlink symbols. The length of the propagation path between the earth terminal and the satellite may then be determined (step 114). In this case, the length of the propagation path distance may be determined, for example, as the Euclidean distance between the two sets of coordinates.

At this point, the earth terminal may launch a communication signal, for example, an entry order wire, from the earth terminal to the satellite (step 116). For example, the entry order wire may be launched on a channel dedicated to that purpose. The satellite then processes the entry order wire, extracting the identification of the earth terminal and measuring the timing error associated with the launch of the entry order wire burst from the earth terminal (step 118). The satellite, for example, may be equipped with an entry order wire processor which detects the presence of the initial entry order wire burst. The entry order wire burst may have to contend for access to the entry order wire processor with other earth terminals which are currently undergoing the commissioning process, and any conflicts may be resolved by using ALOHA techniques, for example.

Subsequently, the satellite may report the entry order wire event to the NCC (step 120). The NCC receives the entry order wire report from the satellite and assigns the earth terminal a channel for use in transmitting synchronization bursts to the satellite (step 122). The NCC then reports the timing error to the earth terminal along with a channel assignment for launching synchronization bursts (step 124). For example, the NCC may send this information to the earth terminal in an ATM cell. At this point, the earth terminal recovers and saves its timing error and synchronization channel assignment (step 126).

The earth terminal is then able to refine the length of the propagation path between the satellite and the earth terminal based on the timing error associated with the launch of the entry order wire (step 128). The correction of the length of the propagation path may then be stored in the earth terminal, for example in the earth terminal's non-volatile memory. The stored length of the propagation path may then be used for future reentry procedures.

The earth terminal then launches synchronization bursts in the assigned synchronization channel (step 130) at regular intervals. The satellite periodically processes the synchronization bursts to determine the timing error of the bursts (step 132). For example, the satellite may determine whether the burst is early, late, absent, or on time with respect to the downlink symbol rate.

The satellite then reports the timing error to the earth terminal using a correction code (step 134). The correction code may represent, for example, that the burst sent by the earth terminal is early, late, absent, or on time. The earth terminal recovers the timing error from the satellite (step 136). The earth terminal also uses the reported timing error to adjust the value of the length of the propagation path (in increments as small or as large as desired, e.g., one downlink symbol) on an ongoing basis (step 136).

The earth terminal typically maintains a downlink symbol counter clocked at the downlink symbol rate. The earth terminal may then adjust the downlink symbol counter to account for any timing errors in transmitting bursts to the satellite. For example, if the earth terminal sends the transmissions too early, the downlink symbol counter will be incremented, and if the earth terminal sends the transmissions too late the downlink symbol counter will be decremented. Additionally, all other clocks within the earth terminal may also be derived from the downlink symbol counter.

When full uplink synchronization for an earth terminal is achieved, the earth terminal may launch an uplink burst to arrive at the satellite at a specific point in time accurate even to a single downlink symbol time. At this point, the earth terminal is fully synchronized and not only may avoid overlap from bursts launched from different earth terminals, but may also have its bursts demodulated at the satellite without explicit processing to recover the symbol timing. Once a two-way earth terminal is fully synchronized, it may become qualified to become active and to transmit bursts in the assigned channel. Furthermore, the earth terminal may refine the time at which it launches uplink bursts to precisely conform with changes in the length of the propagation path between the satellite and the terminal.

Turning to FIG. 2, that figure illustrates a flow diagram 200 of a method of reentering the earth terminal into the system in accordance with one embodiment of the present invention. Once the terminal has undergone the commissioning process, it can directly reenter the stand-by state, for example after being powered off or after interruptions in transmission due to severe rain fade. The steps occurring at the earth terminal include an observation step 206, a first recovery step 210, a formation step 212, a launching step 214, and a second recovery step 220. The steps occurring at the satellite include a timing step 202, and formation step 204, a processing step 216, and a sending step 218. The steps occurring at the NCC include a sending step 208.

As illustrated in FIG. 2, a terminal can directly reenter the stand-by state by using a current estimate of the length of the propagation path. The reference oscillator on the satellite payload produces a master clock signal (step 202) from which all timing signals in the entire system may be derived. As noted above, the satellite sends a continuous stream of downlink frames (step 204) at the downlink symbol rate determined by the master clock. Again, the downlink transmission consists of a series of fixed length frames of ND symbols; for example, a typical downlink frame may consist of 7640 symbols occupying 78 microseconds. The overhead portion of each frame may consist of a fixed synchronization marker of 16 symbols for example. The overhead portion of each frame may also contain a non-repeating frame number, for example of 24 QPSK symbols (or 48 bits).

The earth terminal then observes the downlink transmission and locks onto it (step 206). From the downlink transmission, the earth terminal can develop a downlink frame counter and extract the downlink frame number (step 206). The NCC periodically updates the position of the satellite by sending cells to the earth terminal (step 208). The earth terminal may then recover the position of the satellite from the cells sent by the NCC (step 210). The earth terminal then provides a current estimate of the length of the propagation path between the satellite and the earth terminal (step 212). This current estimate may be based, for example, on the current position of the satellite as reported by the NCC, the location of the earth terminal as entered at step 112, and the value of the correction to the length of the propagation path which was provided by the NCC at step 122.

The earth terminal then launches synchronization bursts in the assigned synchronization channel (step 214). The satellite then processes the synchronization bursts to determine the timing error of the bursts (step 216). For example, the satellite will determine whether the burst is early, late, absent, or on time with respect to the frame timing at the satellite. The satellite then reports the timing error to the earth terminal using a correction code (step 218). The correction code will represent, for example, that the burst sent by the earth terminal is early, late, absent, or on time. The earth terminal recovers the timing error from the satellite (step 220). The earth terminal also uses the reported timing error to adjust the value of the length of the propagation path on an ongoing basis (step 220). Finally, the earth terminal may use the downlink symbol rate as a reference to adjust the earth terminal's basic clock frequency to closely match that of the downlink symbol rate. Once a two-way terminal has become fully re-synchronized, it may become qualified.

Presented below are a set of equations which supplement the discussion above.

$$SD0=ND*FD \qquad (0)$$

$$SD1=SD0+L \qquad (1)$$

$$SD=SD0+2*L \qquad (2)$$

$$FU=(SD\backslash R)\backslash NU \qquad (3)$$

$$SU=(SD\backslash R)@NU \qquad (4)$$

$$PU=SD@R \qquad (5)$$

According to Equation 0, the downlink symbol number SD0 that exists at the satellite when a downlink frame is launched is determined by multiplying the frame number FD by the number of symbols in a frame ND. Equation 1 represents the value of SD1 which is the downlink time that exists when the downlink frame FD is received by the earth terminal. This time is determined by adding the downlink symbol number SD0 to the length L expressed in terms of symbols of the propagation path between the satellite and the earth terminal. According to Equation 2, the time, SD, that an uplink signal would arrive at the satellite if launched at the time the downlink transmission was received is determined by adding the downlink symbol number SD0 to twice the length L of the propagation path between the satellite and the earth terminal. Note that SD is the value previously referred to as the "downlink count".

From the value of SD, an earth terminal may derive the parameters that will exist at the satellite for uplink symbols launched at the current time by using Equations 3, 4, and 5. According to Equation 3, the uplink frame number FU can be determined by integer dividing ("\") the downlink symbol number SD by the ratio ("R") of the downlink symbol rate to the uplink symbol rate. R may be, for example, 175. This result is then integer divided by the number of symbols in an uplink frame NU.

According to Equation 4, the uplink symbol number SU within the uplink frame number can be determined by integer dividing the downlink symbol number SD by the ratio R of the downlink symbol rate to the uplink symbol rate. This result is then divided by the number of symbols in an uplink frame NU and the remainder (the modulo operator "@") gives the value of the uplink symbol number SU.

Finally, according to Equation 5, the partial uplink symbol number PU measured in terms of downlink symbols is determined by taking the remainder of the downlink symbol number SD divided by the ratio of the downlink symbol rate to the uplink symbol rate. The ratio PU/R may be interpreted as the phase of the uplink symbol which, typically, is much longer in duration than a single downlink symbol.

The present invention allows for precise alignment of transmissions accurate even to a small fraction of a single uplink symbol. This precision alignment results in a reduction of guard band time, which will in turn allow more information to be transmitted in the same period of time. Additionally, the present invention will reduce or eliminate the satellite resources devoted to tracking the timing of the symbols. The present invention therefore provides the advantages of increased bandwidth efficiency, data transmission rates, and the like.

While particular elements, embodiments, and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method of synchronizing an earth terminal in a satellite communication network, the method comprising:
   (a) maintaining a downlink symbol counter clocked at a downlink clock rate;
   (b) determining a downlink symbol count representative of a time of arrival at a satellite of a burst transmitted from an earth terminal;
   (c) adjusting said downlink symbol counter to correspond to said downlink symbol count;
   (d) transmitting synchronization bursts from said earth terminal to said satellite in accordance with said downlink symbol counter;
   (e) determining at said satellite, whether said synchronization bursts received at said satellite are one of early, late, absent, and on time; and
   (f) reporting in a downlink signal to said earth terminal, a code representing whether said synchronization burst received at said satellite is one of early, late, absent and on time.

2. The method of claim 1 further comprising extracting a downlink symbol counter clock from said downlink signal.

3. The method of claim 1 further comprising determining a length L of a propagation path between said satellite and said earth terminal.

4. The method of claim 3 further comprising determining an initial estimate of said length L.

5. The method of claim 4 wherein said step of determining an initial estimate of said length L comprises:
   (i) storing an earth terminal location in said earth terminal;
   (ii) providing a satellite position of said satellite to said earth terminal; and
   (iii) determining said initial estimate using said satellite position and said earth terminal location.

6. The method of claim 5 wherein said step of providing a satellite position comprises providing a cell bearing the current coordinates of the satellite.

7. The method of claim 3 further comprising periodically updating the value of said length L.

8. The method of claim 7 wherein said step of periodically updating comprises:
   (i) storing an earth terminal location in said earth terminal;
   (ii) updating a satellite position of said satellite with said earth terminal;
   (iii) redetermining said length L using said satellite position and said earth terminal location.

9. The method of claim 8 wherein said step of updating a satellite position comprises periodically transmitting updated satellite coordinates to said earth terminal.

10. The method of claim 1 wherein said step of determining downlink symbol count comprises maintaining a downlink frame counter and multiplying by a number of symbols in said downlink frame.

11. The method of claim 1 further comprising adjusting said downlink symbol counter to account for changes in the length L of a propagation path between said satellite and said earth terminal.

12. The method of claim 1 wherein said step of determining a downlink symbol count comprises extracting a downlink frame number from said downlink signal and multiplying by a number of symbols in said downlink frame.

13. The method of claim 12 further comprising adjusting said downlink symbol counter to account for changes in length L of a propagation path between said satellite and said earth terminal.

14. The method of claim 4 further comprising:
   (i) transmitting a communication signal from said earth terminal to said satellite; and
   (ii) receiving a timing error from said satellite.

15. The method of claim 14 further comprising redetermining said length L using said timing error.

16. The method of claim 15 further comprising storing said length L in said earth terminal.

17. The method of claim 14 wherein said step of transmitting a communication signal comprises transmitting an entry order wire from said earth terminal to said satellite.

18. The method of claim 1 further comprising:
  determining an identification of said earth terminal;
  providing said identification of said earth terminal a network control center;
  generating a synchronization channel assignment for said earth terminal; and
  transmitting said synchronization channel assignment to said earth terminal.

19. The method of claim 18 further comprising adjusting said downlink symbol counter according to said timing error received from said satellite in response to a communication signal transmitted to said satellite from said earth terminal.

20. The method of claim 19 wherein said step of adjusting comprises:
  launching synchronization bursts from said earth terminal to said satellite in said synchronization channel;
  processing said synchronization bursts to determine an uplink timing error associated with said synchronization bursts;
  transmitting said uplink timing error to said earth terminal; and
  adjusting the value of said downlink symbol counter according to said uplink timing error.

21. The method of claim 20 wherein said step of transmitting said uplink timing error comprises transmitting a correction code indicative of said timing error to said earth terminal.

22. The method of claim 21 wherein said step of transmitting a correction code comprises transmitting a code representing one of an early indication or a late indication.

23. The method of claim 21 wherein said step of transmitting a correction code comprises transmitting a multi-bit code representing one of an early indication, a late indication, or an absent indication.

24. The method of claim 21 where said step of transmitting a correction code comprises transmitting a code representing one of an early indication, a late indication, an absent indication, or an on time indication.

25. The method of claim 19 further comprising storing said timing error.

26. The method of claim 25 further comprising, upon re-entry of said earth terminal, adjusting said downlink symbol counter to account for said length L and said stored timing error.

27. A synchronization method for a satellite communication network, the method comprising:
  (a) establishing a communication satellite in orbit;
  (b) establishing an earth terminal in communication with said satellite;
  (c) generating a master clock on said satellite;
  (d) transmitting downlink symbols synchronously with said master clock from said satellite to said earth terminal;
  (e) maintaining at said earth terminal a downlink symbol counter clocked at a downlink clock rate;
  (f) determining a downlink symbol count representative of a time of arrival of a burst transmitted from an earth terminal to a satellite;
  (g) adjusting said downlink symbol counter to correspond to said downlink symbol count upon receipt of a predetermined reference point in a downlink frame;
  (h) transmitting synchronization bursts from said earth terminal to said satellite in accordance with said downlink symbol counter;
  (i) determining at said satellite, whether said synchronization bursts received at said satellite are one of early, late, absent, and on time; and
  (j) reporting in a downlink signal to said earth terminal, a code representing whether said synchronization burst received at said satellite is one of early, late, absent and on time.

28. The method of claim 27 further comprising extracting a downlink symbol counter clock from said downlink signal.

29. The method of claim 27 further comprising determining a length L of a propagation path between said satellite and said earth terminal.

30. The method of claim 29 further comprising determining an initial estimate of said length L.

31. The method of claim 30 wherein said step of determining an initial estimate of said length L comprises:
  (i) storing an earth terminal location in said earth terminal;
  (ii) providing a satellite position of said satellite to said earth terminal; and
  (iii) determining said initial estimate using said satellite position and said earth terminal location.

32. The method of claim 31 wherein said step of providing a satellite position comprises providing satellite ephemeris data.

33. The method of claim 30 further comprising periodically updating the value of said length L.

34. The method of claim 33 wherein said step of periodically updating comprises:
  (i) storing an earth terminal location in said earth terminal;
  (ii) updating a satellite position of said satellite with said earth terminal;
  (iii) redetermining said length L using said satellite position and said earth terminal location.

35. The method of claim 34 wherein said step of updating a satellite position comprises periodically transmitting updated satellite coordinates to said earth terminal.

36. The method of claim 27 wherein said step of determining a downlink symbol count comprises maintaining a downlink frame counter and multiplying by a number of symbols in said downlink frame.

37. The method of claim 27 further comprising adjusting said downlink symbol counter to account for a length L of a propagation path between said satellite and said earth terminal.

38. The method of claim 27 wherein said step of determining a downlink symbol count comprises extracting a downlink frame number from said downlink signal and multiplying by a number of symbols in said downlink frame.

39. The method of claim 38 further comprising adjusting said downlink symbol counter to account for a length L of a propagation path between said satellite and said earth terminal.

40. The method of claim 30 further comprising:
  transmitting a communication signal from said earth terminal to said satellite; and
  receiving a timing error from said satellite.

41. The method of claim 40 further comprising redetermining said length L using said timing error.

42. The method of claim 41 further comprising storing said length L in said earth terminal.

43. The method of claim 40 wherein said step of transmitting a communication signal comprises transmitting an entry order wire from said earth terminal to said satellite.

44. The method of claim 27 further comprising:

determining an identification of said earth terminal;

providing said identification of said earth terminal a network control center;

generating a synchronization channel assignment for said earth terminal; and transmitting said synchronization channel assignment to said earth terminal.

45. The method of claim 44 further comprising adjusting said downlink symbol counter according to said timing error received from said satellite in response to a communication signal transmitted to said satellite from said earth terminal.

46. The method of claim 45 wherein said step of adjusting comprises:

launching synchronization bursts from said earth terminal to said satellite in said synchronization channel;

processing said synchronization bursts to determine an uplink timing error associated with said synchronization bursts;

transmitting said uplink timing error to said earth terminal; and adjusting the value of said downlink symbol counter according to said uplink timing error.

47. The method of claim 46 wherein said step of transmitting said uplink timing error comprises transmitting a correction code indicative of said timing error to said earth terminal.

48. The method of claim 47 wherein said step of transmitting a correction code comprises transmitting a code representing one of an early indication or a late indication.

49. The method of claim 47 wherein said step of transmitting a correction code comprises transmitting a multi-bit code representing one of an early indication, a late indication, or an absent indication.

50. The method of claim 47 wherein said step of transmitting a correction code comprises transmitting a code representing one of an early indication, a late indication, an absent indication, or an on time indication.

51. The method of claim 45 further comprising storing said timing error.

52. The method of claim 51 further comprising, upon re-entry of said earth terminal, adjusting said downlink symbol counter to account for said length L and said stored timing error.

* * * * *